United States Patent Office 2,863,332
Patented Dec. 9, 1958

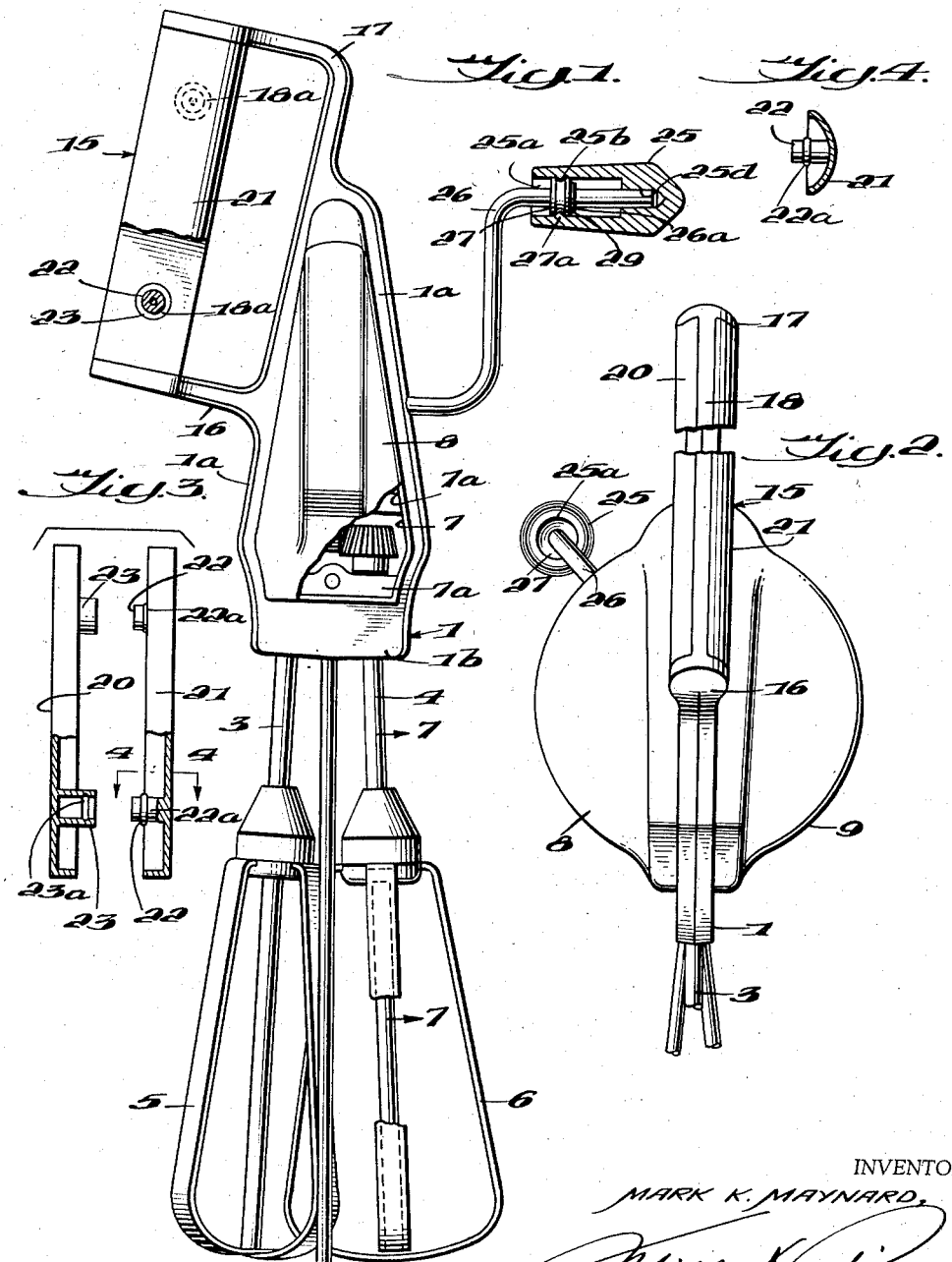

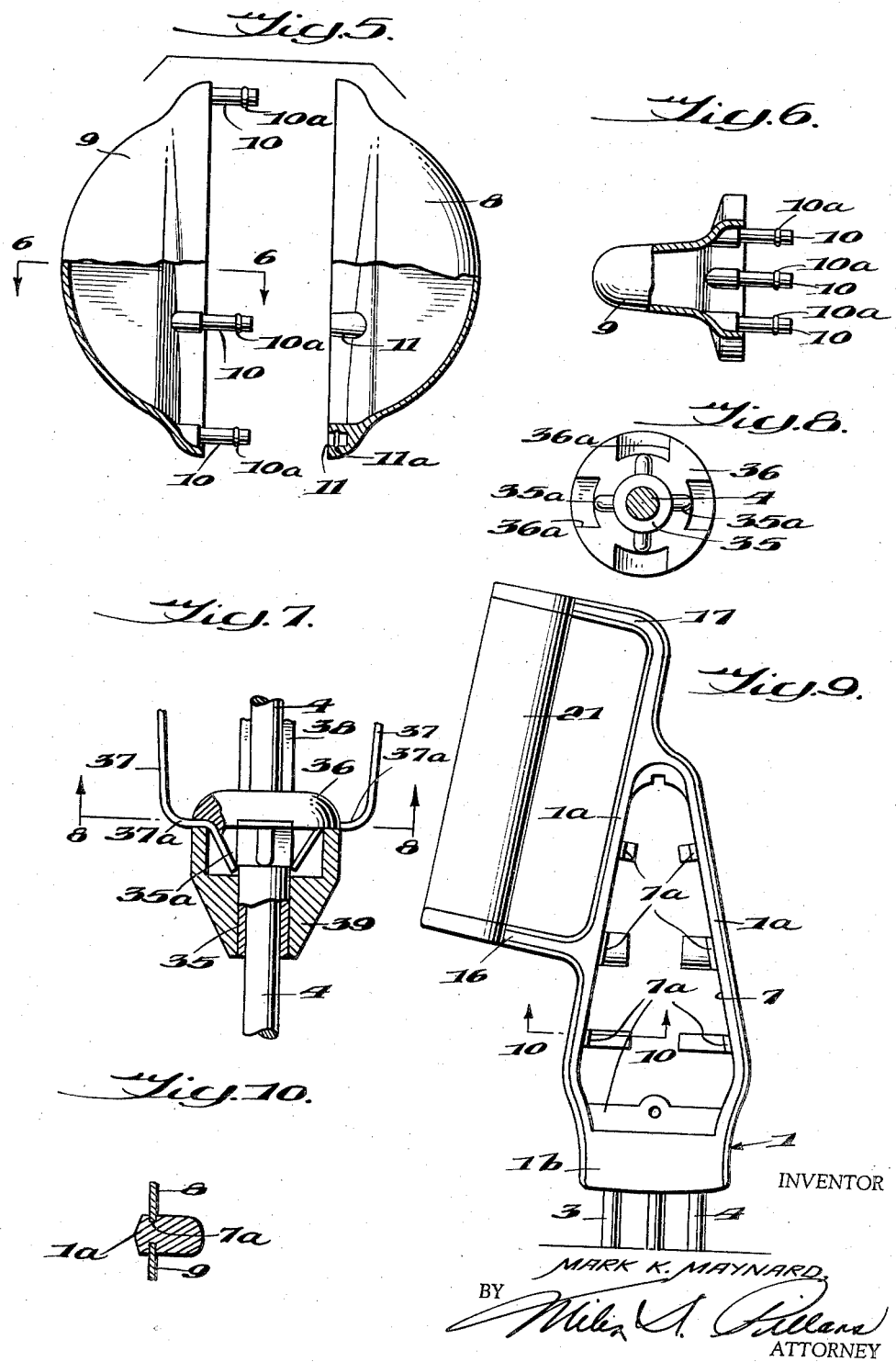

2,863,332

HAND OPERATED MIXER

Mark K. Maynard, Glendale, Calif.

Continuation of application Serial No. 135,096, December 27, 1949. This application March 11, 1955, Serial No. 493,751

4 Claims. (Cl. 74—665)

This invention relates to a type of kitchen utensils commercially known as mixers or beaters and refers particularly to improvements in means for fastening component parts of such devices together.

In hand operated mixers, such as commonly found on the market, the gears by means of which the speed of the mixing elements is increased, are generally mounted within a light, open frame to the end of which a handle is secured. This customary combination not only produces an unsightly device but is also found objectionable because the gears, being left almost entirely exposed, quickly will collect dirt and other foreign matters which, due to the construction and arrangement of the gears, are very difficult to remove. Another serious objection to this type of beater is that danger is present of receiving injuries due to accidental contact with the gears during the operation of the device. Another objection is that, in accidentally dropping the beater, there is danger of damaging the gears or bending the frame out of shape.

It is, in view of the foregoing, the object of the present invention to provide a mixer of the type referred to in which the gears are completely covered and fully protected. A further object is to provide a device the component parts of which are so constructed and shaped that they may be quickly assembled without having to resort to the use of special tools and will be held securely in assembled position during the life of the device. These and other objects of the invention, together with the many advantageous features thereof are hereinafter fully set forth and reference is invited to the accompanying drawings in which a preferred form of the invention is illustrated.

In the drawings:

Fig. 1 is a side view of a beater embodying the invention and with certain portions thereof partly broken away for the sake of clearness;

Fig. 2 is a substantially corresponding edge view of the device;

Fig. 3 is a composite view of two parts of the device which, when assembled in the manner hereinafter described, will form the hand grip of the beater;

Fig. 4 is a cross-sectional end view through one of the parts of Fig. 3;

Fig. 5 illustrates the two members which, when combined, form the gear casing of the invention;

Fig. 6 is a cross-sectional end view of one of these parts taken substantially on line 6—6 of Fig. 5 in the direction of the arrow;

Fig. 7 is an inverted detail view, on a larger scale, of a portion of the device appearing between lines 7—7 of Fig. 1 and illustrating the manner in which the beater elements are secured in position on the shafts thereof;

Fig. 8 is a bottom view of one of the component parts of this assembly viewed in direction of arrows 8 of Fig. 7;

Fig. 9 is a fragmentary side elevational view of the hand beater frame structure illustrating the details of the recessed seats on both sides of the frame which are adapted to engage the edges of the casing members; and Fig. 10 is a fragmentary sectional view taken along line 10—10 of Fig. 9 showing the seats on both sides of the frame side members.

As shown in Figs. 1 and 2 of the drawings, the numeral 1 denotes an open frame within which the conventional speed increasing gears (not shown) are mounted in any commercially well known manner and from which extend shafts 3, 4 to the usual beater elements 5, 6. Ordinarily such frame is made from very thin strips of sheet metal but it is in this case of much heavier construction in order to produce a much more substantial structure and so as to make it possible to provide on each side of the frame within the inner opening thereof a recess 7, into which are fitted two casing members 8 and 9.

These members are preferably molded from some suitable somewhat resilient plastic material of a shape to encompass the gearing within the frame and to seat tightly in the recesses or seats 7a on both inner sides of the frame member sides 1a and base 1b. The contour of the two members may be exactly alike but one member is shown fitted with a series of studs 10 inwardly projecting from the inner edge thereof for engagement with corresponding sockets 11 of the other member to tie the two members rigidly together within the recesses of the frame. As best shown in Fig. 5 of the drawings, each of the studs 10 is near the outer ends thereof made with an annular enlargement 10a which enlargements, when the parts are assembled, are forced into the sockets 11 of the other member to enter into an annular groove 11a of this socket to become seated therein when the members are completely mounted in position within the recesses 7 of the frame. It is to be understood that, in the drawings, the sizes and proportions of the shoulders 10a and the grooves 11a are, for the sake of clearness, greatly exaggerated, but that when properly proportioned the plastic material of the two members will be found sufficiently resilient to permit of forcing the shoulder 10a of the stud into the groove 11a of the corresponding socket during the operation of assembly.

Returning now to Fig. 1, it is noticed that a hand grip 16 is mounted on one side of the frame in lateral spaced relation thereto. For the purpose of this arrangement, the frame is shown made with laterally projecting arms 16, 17, the outer ends of which are interconnected by means of a relatively thin, flat membrane 18 of a width to receive thereon gripping elements 20, 21.

As indicated in Fig. 3, these elements may in general outline be exactly alike but one member is shown made with studs 22 inwardly projecting from the inner surface thereof for engagement with socket members 23 of the other element. These engaging elements are very similar to those of the casing members 8, 9 and they are similarly provided with interfitting shoulders and grooves 22a, 23a, respectively. So, while these interengaging members may vary in size and proportions from those of the casing members 8, 9, they will remain identical in principle and are operable in like manner to complete the assembly of the hand grip. The membrane 18 of the frame is made with perforations 18a of a size to receive therein the projecting inner ends of the socket members 23 and to maintain the parts firmly in position thereon.

The device of the invention is fitted with a handle 25 which is mounted in position on the end of the hand crank 27 of the device in substantially the same manner in which the cover members and the hand grip members are assembled on the frame. The handle is to this end shown recessed at the inner end thereof, as indicated at 25a, and an annular rib 25b rises from the inner surface of this recess intermediate the ends thereof. The crank is fitted with a shoulder portion 27 in which is cut an annular groove 27ª of a size to receive therein the rib 25ᵇ of the handle when the latter is pushed in position on the end of the crank. But it is pointed out that the groove 27ª may be cut into the recess 25ª and the rib 25ᵇ placed on the shoulder portion 27 as in the above described combinations. For the sake of convenience and in order to cheapen the construction of the device the member 27 is a separate part which, like the handle 25, is made from a suitable, somewhat resilient plastic composition. It is placed on the end of the crank and held in position thereon by means of a slotted ring 29 engaging a groove 26ª of the crank. When so constructed, it is seen that once the handle is pushed in position, it will be locked securely against removal from the crank. But the member 27 may, of course, form an integral part of the crank, if preferred. In order better to guide the handle a small bore 25ᵈ is sunk therein in continued axial alignment with the end of the crank and of a size fittingly to receive the end of the crank therein.

The manner in which the beater elements are secured in position on the shafts 3, 4 is best illustrated in Figs. 7 and 8. A tubular stem 35 is pressed or otherwise rigidly mounted in position on the shaft 4 and it is fitted with a head in the bottom surface of which are shown recesses 36ª of a depth and width snugly to seat therein the lower ends of the blades 37 of the beater elements. A sleeve 39 is caused to engage the stem 35 and it is pressed into position against the inwardly directed portions 37ª of the blades, thereby rigidly to maintain the beater element in position on the shaft 4. The sleeve is at 39ª shown recessed freely to receive the inner ends of the beater element which ends, as best shown in Fig. 7, come to rest against inclined ribs 35ª of the stem 35.

It is seen from the foregoing description that I have provided coverings for various parts of the beater which render the beater much more convenient to handle and operate and which, in addition, considerably enhance the appearance of the utensil. Furthermore, and even more important it is to note that these parts may be quickly and securely put together by hand, without having to resort to tools or fixtures of any kind. Finally, it is important that the method of assembly and the interengaging elements of the various coverings are alike in principle and merely may vary somewhat in size and proportions.

In cases where the covers for the gears and the handle are made from a moldable plastic composition it may, of course, be possible to apply to the sockets and to the studs engaging these sockets a suitable binder, such as acetone at the time the parts are assembled. In such cases it may be found preferable to leave out the annular shoulders 10ª and the annular grooves into which these shoulders come to rest.

This application is a continuation of my application Serial No. 135,096 filed December 27, 1949 which bears the same title.

I claim:

1. In a hand operated beater, a frame including a mounting base with passages for the extension of shafts therethrough from the outer face thereof providing mountings with a close bearing fit for the shafts, spaced side members for the frame extending from said mounting base on the side thereof opposite to said outer face, an operating handle having a portion extending between and mounted on both frame side members, driving connection means positioned between said frame side members and operatively connecting said operating handle to the shafts, an enclosure means for the driving connection means comprising two complementary casing members each formed with an open side and positioned with the open sides facing each other and arranged in snug engagement with inner sides of said frame, and means within said enclosure means for securing said casing members together in enclosing relationship.

2. In a hand operated beater, a frame including a mounting base with passages for the extension of shafts therethrough from the outer face thereof providing mountings with a close bearing fit for the shafts, spaced side members for the frame extending from said mounting base on the side thereof opposite to said outer face, an operating handle having a portion extending between and mounted on both frame side members, gearing positioned between said frame side members and operatively connecting said operating handle to the shafts, an enclosure means for the gearing comprising two complementary casing members each formed with an open side and positioned with the open sides facing each other and arranged in snug engagement with inner sides of said frame, and means comprising cooperating friction binding bosses and sockets formed on the inner sides of said casing members for securing said casing members together in gear enclosing relationship.

3. In a hand operated beater, an integral frame including a mounting base with passages for the extension of shafts therethrough from the outer face thereof providing mountings with a close clearance for the shafts, spaced frameside members extending from said mounting base on the side thereof opposite to said outer face and joined together at the ends away from said base, an operating handle rotatably mounted on said frame, gearing positioned between said frame side members and operatively connecting said operating handle to the shafts, said frame base and side members having opposite side surfaces and joining inner and outer surfaces, means adjacent to said opposite side surfaces of said frame forming recessed seats facing outwardly on both sides of said frame, an enclosure means for gearing comprising two complementary casing members each formed with an open side, said casing members being positioned with the open sides thereof facing each other and in seating engagement with said frame seats and enclosed by said frame, and means for securing said casing members together in enclosing relationship.

4. In a hand operated beater, an integral frame including a mounting base with journal passages for the extension of shafts therethrough from the outer face thereof providing mountings with a close bearing clearance for the shafts, spaced frame side members extending from said mounting base on the side thereof opposite to said outer face and joined together at the ends away from said base, an operating handle mounted on both side frame members and extending from one side thereof, driving connection means positioned between said side members and operatively connecting said operating handle to the shafts, said frame base and side members including said joined ends thereof having opposite side surfaces and joining inner and outer surfaces, recessed seats on said frame inner surfaces facing oppositely outwardly respectively adjacent to said opposite frame side surfaces, an enclosure means for the driving connection means comprising two complementary plastic casing members each formed with an open side, said casing members being positioned with the open sides thereof facing each other in seating engagement with said recessed seats with a snug fit with said frame inner surfaces and adjacent side surfaces, means comprising aligned friction binding complementary bosses and sockets on said plastic casing members for securing said casing members together in enclosing relationship, and a hand grip integrally secured to and extending laterally from said frame on the side thereof opposite to said operating handle.

References Cited in the file of this patent

UNITED STATES PATENTS

| | | |
|---|---|---|
| 2,336,699 | Neth et al. | Dec. 14, 1943 |
| 2,401,598 | Wood | June 4, 1946 |
| 2,505,362 | Lawrence | Apr. 25, 1950 |
| 2,565,723 | Euler et al. | Aug. 28, 1951 |